United States Patent Office 2,747,734
Patented May 29, 1956

2,747,734

COMPOSITION OF MATTER FOR REMOVING ABRADANT SUBSTANCES FROM EXFOLIATED VERMICULITE AND PROCESS OF USING SAME

Milton F. Rose, Prescott, and Jack E. A. Stone, Phoenix, Ariz.

No Drawing. Application June 12, 1953, Serial No. 361,432

3 Claims. (Cl. 209—173)

This invention relates to a composition of matter for removing abradant and undesired substances for exfoliated vermiculite and to a process for removing such substances from exfoliated vermiculite and minerals of the vermiculite group.

It has been known for some time that vermiculite, when commercially clean, has many valuable uses such as a lubricant, as an additive to lubricants, as anti-friction paints, as insulating paints or compounds, in printers inks, as car polish, etc., but that when expanded, abradants and undesirable substances naturally existing in the mineral rendered the normal expanded product unfit for the uses above mentioned.

Various means have been tried and suggested for removing abradants and undesirable substances but, so far as known, no substance or method heretofore has been practical and satisfactory commercially.

It is well known that vermiculite when heated gives off water, or is dehydrated. When dehydrated the mineral exfoliates or expands.

Vermiculite to be used for lubricants and many other commercial uses or purposes must first be dehydrated at a heat sufficient to expand all books and particles, then cleaned so as to remove all of the undesirable substances, then dried, then ground to the desired size, and thereafter mixed with the desired binding vehicle or carrying medium or used in the dry unmixed state. The abradants and unwanted foreign waste materials are found not only in the ground mass, after dehydration, but are contained between the laminae, leaves or plates of the vermiculite, as well.

Fortunately, vermiculite, in its desired dry expanded form before resaturation with water, tends to float on water, while the undesired substances all have a specific gravity as great or greater than water, and tend to sink.

One object of this invention is to provide a method for quickly and cheaply removing abradants, non-lubricants, and foreign waste materials from dehydrated, expanded vermiculite.

Another object of this invention is to provide a composition of matter which will quickly and cheaply loosen and separate abradants, non-lubricants, and unwanted waste substances from expanded vermiculite, by taking advantage of the inherent characteristics, both physical and chemical, of the minerals, liquids, gases and chemicals involved.

Another object is to provide a fluid composition of matter which will loosen, release, and separate abradants, non-lubricants, and unwanted foreign waste materials from particles of expanded vermiculite and concurrently act as a differential flotation agent, floating the cleaned vermiculite on its surface, and causing the undesirable substances to be depressed.

Still another object of this invention is to use the inherent physical and chemical properties of readily available commercial compounds to acomplish the cleaning of the expanded mineral vermiculite, and to separate the undesired substances therefrom.

In the preferred form the fluid composition of the matter used consists of:

| | Parts by volume |
|---|---|
| Water | 1200 |
| Hydrogen peroxide (commercial) (6% solution) | 1 |
| Ammonium hydroxide (commercial) | 1 |
| Sodium hypochlorite (commercial) | 1 |

The three last mentioned substances are added one at a time, with stirring, to the water.

This solution, thus produced, has a specific gravity of about 0.998. This is less than water or the minerals involved.

While we have specified sodium hypochlorite, there are many hypochlorites which will work just as well. Also, oxygen bearing salts of the halogens can be used in place of commercial sodium hypochlorite.

The ammonium hydroxide specified could be replaced by ammonium molybdate, ammonium acetate, ammonium sulphate, by many of the ammino compounds, or by ammonia compounds releasing ammonia by direct or indirect reations. Nitrogen and hydrogen bearing substances, reacted upon by liquid oxidizers, such as peroxides or oxy-chlorides, or by oxygen in its various molecular states, may also be substituted.

Method

Dehydrated vermiculite of from minus 6 mesh to plus 10 mesh, which is the most economical size, is introduced into a quantity of the above fluid composition, contained in a vessel of moderate depth, with slight agitation. The amount of agitation need be only sufficient to wet the particles of vermiculite. The substances are then allowed to stand quiescent for about 2 hours. The vermiculite rises to the surface and separates from all undesirable substances in the ground mass, such as particles of quartz, feldspar, lime, mica, talc (etc.). These substances are depressed, and sink to the bottom of the vessel.

The usable, cleaned vermiculite is then skimmed from the surface of the liquid. The liquid is then ready for another batch of vermiculite. When too much waste material has accumulated in the bottom of the liquid in the vessel the upper portion can be decanted from the lower portion which contains the undesired substances. The solution once made up can be used many times. Losses of liquid caused by absorption of the liquid by the cleaned vermiculite, and losses due to removal of the unwanted waste material must of course be compensated. The solution, except for the above losses, will last indefinitely.

A modification of the above mentioned solution, which I term the activating solution, may be made as follows:

| | Fluid ounces |
|---|---|
| Water | 1280 |
| Ammonium molybdate solution (normal) | 1 |
| Hydrogen peroxide (commercial strength) | 1 |
| Sodium hypochlorite (commercial strength) | 1 |

It will be noted that in this solution, the ammonium hydroxide is replaced by other ammonium molybdate. This in turn may be replaced by other ammonium compounds, ammonia compounds, or ammino compounds.

This solution works substantially as well as the first solution, but is more expensive.

A further modification consists of the use of a solution composed of:

| | Fluid ounces |
|---|---|
| Water | 1280 |
| Hydrogen peroxide (any strength) | 1 |
| Ammonium hydroxide (any strength) | 1 |

Note that in this composition, sodium hypochlorite is entirely eliminated. This solution, used according to the method above explained, will clean vermiculite mineral where it is not too dirty and when time is not important.

In all cases it is to be noted that hydrogen peroxide is present. Also present is some chemical containing ammonia or which will release ammonia into the solution. These substances in combination with the water seem to have an active influence in loosening and clearing the laminae of vermiculite of foreign substances. All substances having a greater specific gravity than the solution, per se, sink to the bottom of the solution.

The other element, such as the sodium hypochlorite, or any of the oxygen bearing salts of the halogens, speeds up the separating action and brings it to an earlier conclusion.

Oxygen seems to be a prime factor in the solution. We find it more economical and convenient to use hydrogen peroxide with its contained oxygen. The hydrogen peroxide and the ammonium hydroxide activate the solution, and the ammonium hydroxide at the same time decreases the specific gravity of the solution to less than 1.0.

The addition of any oxygen bearing salts of the halogens seems to further activate the solution and cause a speed up in the cleaning action of the solution on the vermiculite.

The exact chemical-physical reaction that takes place in the solution is not known. The results, however, as stated, are known, and the process is exceedingly effective. Only a slight amount of agitation need be used when the vermiculite is first entered into the solution. The action that follows is substantially automatic and needs no special equipment. After the separation, skimming may be conducted with any well known apparatus for that purpose.

We claim:

1. The method of cleaning particles of exfoliated vermiculite by removing particles of abradants therefrom consisting of, mixing the said vermiculite particles to be cleaned, with slight agitation, in a fluid composition of matter composed of water 1200 parts; commercial hydrogen peroxide 1 part; commercial ammonium hydroxide 1 part; and commercial sodium hypochlorite 1 part; all parts by volume; allowing the mixture to stand quiescent until the vermiculite particles float on the surface of said fluid composition and the abradants sink in said fluid composition; skimming the cleaned vermiculite particles from the surface of said fluid composition, and discarding the substances in said fluid composition which do not float.

2. The method of cleaning particles of exfoliated vermiculite by removing abradants and non-lubricants from the laminae of the vermiculite by introducing the vermiculite particles to be cleaned into a fluid composition consisting of water about 1200 parts by volume; hydrogen peroxide, approximately 6 per cent solution, about 1 part by volume; ammonium hydroxide specific gravity .90—about 1 part by volume; and sodium hypochlorite, 5 per cent solution about 1 part by volume; stirring the vermiculite particles into said composition until all parts are wetted; allowing the mixture to stand quiescent until vermiculite particles rise and float on the surface of said fluid and abradants sink below the surface of said fluid; skimming the floating vermiculite particles from the surface of said fluid composition; and discarding substances which have sunk below the surface of said fluid composition.

3. The method of cleaning particles of exfoliated vermiculite by removing abradants and non-lubricants from the laminae of the vermiculite by introducing the vermiculite particles to be cleaned into a fluid composition consisting of water 1280 fluid ounces; normal ammonium molybdate solution, one fluid ounce; hydrogen peroxide, 6% commercial strength solution, 1 fluid ounce; and sodium hypochlorite, 5% solution, 1 fluid ounce, stirring the vermiculite particles into said composition until all parts are wetted; allowing the mixture to stand quiescent until vermiculite particles rise and float on the surface of said fluid and abradants sink below the surface of said fluid; skimming the floating vermiculite particles from the surface of said fluid composition; and discarding substances which have sunk below the surface of said fluid composition.

References Cited in the file of this patent

UNITED STATES PATENTS

| 2,465,228 | Hein | Mar. 22, 1949 |

FOREIGN PATENTS

| 315,352 | Germany | Oct. 22, 1919 |